(12) United States Patent
Saito et al.

(10) Patent No.: US 9,500,281 B2
(45) Date of Patent: Nov. 22, 2016

(54) FLUID PRESSURE CYLINDER

(71) Applicant: SMC Corporation, Chiyoda-ku (JP)

(72) Inventors: Junichi Saito, Kashiwa (JP); Koji Hara, Tsukubamirai (JP); Toshio Sato, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 377 days.

(21) Appl. No.: 14/093,233

(22) Filed: Nov. 29, 2013

(65) Prior Publication Data

US 2014/0157981 A1 Jun. 12, 2014

(30) Foreign Application Priority Data

Dec. 10, 2012 (JP) .................................. 2012-269291

(51) Int. Cl.
| | |
|---|---|
| F16J 1/02 | (2006.01) |
| F16J 10/02 | (2006.01) |
| F16J 1/00 | (2006.01) |
| F16J 1/12 | (2006.01) |
| F15B 15/14 | (2006.01) |
| F15B 15/22 | (2006.01) |

(52) U.S. Cl.
CPC ............ *F16J 10/02* (2013.01); *F15B 15/1447* (2013.01); *F15B 15/226* (2013.01); *F16J 1/008* (2013.01); *F16J 1/12* (2013.01)

(58) Field of Classification Search
CPC ... F15B 15/226; F15B 15/1447; F16J 10/02; F16J 1/12; F16J 1/00; F16J 1/001; F16J 1/003; F16J 1/005; F16J 1/008; F16J 15/3268
USPC .... 92/192, 240, 85 R, 85 B, 85 A, 107, 244, 92/245; 91/408
See application file for complete search history.

(56) References Cited

U.S. PATENT DOCUMENTS

| | | | | | |
|---|---|---|---|---|---|
| 2,994,571 | A | * | 8/1961 | Peras | ................... F16J 15/3284 |
| | | | | | 277/437 |
| 3,136,228 | A | * | 6/1964 | Dailey | ..................... F16J 1/008 |
| | | | | | 92/243 |
| 5,193,433 | A | * | 3/1993 | Reimer | ................. F15B 15/223 |
| | | | | | 91/27 |

FOREIGN PATENT DOCUMENTS

| | | | |
|---|---|---|---|
| DE | 20 2005 013 185 U1 | 11/2005 | |
| DE | 202005013185 | * 11/2005 | .......... F15B 15/1447 |

(Continued)

OTHER PUBLICATIONS

Office Action dated Aug. 30, 2016, in Japanese Patent Application No. 2012-269291 (with Partial English-language Translation) 5 pages.

*Primary Examiner* — Michael Leslie
*Assistant Examiner* — Dustin T Nguyen
(74) *Attorney, Agent, or Firm* — Oblon, McClelland, Maier & Neustadt, L.L.P.

(57) ABSTRACT

A piston is provided displaceably in the interior of a cylinder tube that constitutes a fluid pressure cylinder, and a piston cover made from an elastic material is disposed so as to cover one end surface of the piston. The piston cover comprises a main body portion confronting a head cover of the cylinder tube, a guide portion covering an outer circumferential surface of the piston and disposed in sliding contact with an inner circumferential surface of a cylinder hole, and a hook portion folded toward an inner circumferential side with respect to the guide portion. Upon displacement of the piston toward the head cover, shocks are absorbed by abutment of the main body portion against the head cover. When the piston is displaced along the cylinder tube, the guide portion serves to guide the piston in the axial direction by sliding contact with the cylinder hole.

7 Claims, 3 Drawing Sheets

(56) References Cited

FOREIGN PATENT DOCUMENTS

| | | |
|---|---|---|
| JP | 49-146392 | 12/1974 |
| JP | 57-096807 | 6/1982 |
| JP | 10-238512 A | 9/1998 |
| JP | 2010-286014 A | 12/2010 |
| JP | 2012-229760 A | 11/2012 |

* cited by examiner

FLUID PRESSURE CYLINDER

CROSS-REFERENCE TO RELATED APPLICATION

This application is based upon and claims the benefit of priority from Japanese Patent Application No. 2012-269291 filed on Dec. 10, 2012, the contents of which are incorporated herein by reference.

BACKGROUND OF THE INVENTION

Field of the Invention

The present invention relates to a fluid pressure cylinder for displacement of a piston in an axial direction under the supply of a pressure fluid.

Description of the Related Art

Heretofore, as a means for transporting workpieces or the like, for example, a fluid pressure cylinder having a piston which is displaced under the supply of a pressure fluid has been used. In such a fluid pressure cylinder, for example, as disclosed in the specification of German Utility Model No. 20 2005 013 185 (Patent Document 1), a piston is disposed displaceably in the interior of a tubular-shaped cylinder tube, with a piston rod connected to the piston. In addition, the piston is displaced upon supply of a pressure fluid, and a damper made from an elastic material is mounted on an end surface of the piston, with the aim of absorbing shocks when the piston comes into abutment against a wall surface at the displacement end position thereof. Further, a piston packing, which is disposed on the outer circumferential surface of the piston, is formed integrally with the damper.

Further, with a fluid pressure cylinder disclosed in Japanese Laid-Open Patent Publication No. 10-238512 (Patent Document 2), a buffering body retaining groove is formed by a cutting process or the like performed with respect to an end surface of the piston. A rubber cushion that functions as a damper is installed in the buffering body retaining groove, which is formed in an annular shape. A piston packing and a wear ring are further mounted, respectively, in annular grooves formed on the outer circumferential surface of the piston.

SUMMARY OF THE INVENTION

With the fluid pressure cylinder according to the aforementioned Patent Document 1, the installation groove for mounting of the damper is formed on the end surface of the piston, and another installation groove for mounting of the guide member is formed separately on the outer circumferential surface of the piston. For this reason, a need arises for the lengthwise dimension of the piston to be increased for enabling formation of the two types of installation grooves, accompanied by the problem that the lengthwise dimension of the fluid pressure cylinder is made larger in scale. Further, since the damper and the piston packing are formed integrally, even in the case that respective required capabilities such as materials and hardness, etc., of the damper and the piston packing differ from each other, the damper and the piston packing can only be formed from the same material, leading to the concern that desired capabilities thereof cannot be fulfilled.

Further, with the fluid pressure cylinder according to Patent Document 2, since it is necessary to form the buffering body retaining groove by a cutting process (e.g., recess processing) performed with respect to the end surface of the piston, there is a problem of increased manufacturing costs.

Furthermore, when the piston packing and the wear ring are installed on the piston, since the outer diameters of the annular grooves for installation thereof are substantially the same as the outer diameter of the piston, the installation procedure is difficult, and ease of assembly is decreased.

Furthermore, recently, demands have been growing in the art to reduce the number of parts in fluid pressure cylinders and to improve manufacturability by enhancing the ease and working efficiency with which such fluid pressure cylinders are assembled.

A general object of the present invention is to provide a fluid pressure cylinder in which manufacturing costs can be reduced and ease of assembly can be enhanced.

The present invention is characterized by a fluid pressure cylinder comprising a cylinder main body having a pair of ports for supplying and discharging a pressure fluid, and a cylinder chamber into which the pressure fluid is introduced from the ports, a piston on which a piston packing is installed in an installation groove formed on an outer circumferential surface of the piston, and which is disposed displaceably along an axial direction in the interior of the cylinder chamber, and a cover member mounted on one end side of the piston, and having a damper portion that absorbs shocks caused when the piston comes into abutment against the cylinder main body at a displacement end position where the piston is displaced to an end of the cylinder main body, wherein a groove part, on which the cover member is mounted, is formed on the outer circumferential surface of the piston and is disposed adjacent to the installation groove, an outer diameter of the groove part being smaller than an outer diameter of the piston.

According to the present invention, in the fluid pressure cylinder, the cover member is mounted on one end side of the piston disposed in the cylinder chamber of the cylinder main body, while on the cover member, the damper portion is provided to absorb shocks caused when the piston comes into abutment against the cylinder main body at a displacement end position where the piston is displaced to the end of the cylinder main body.

Accordingly, due to the cover member being mounted on the one end side of the piston, shocks that are generated at the displacement end position can be absorbed by the damper portion. In addition, since the outer diameter of the groove part on which the cover member is installed is set to be small in relation to the installation groove, which is formed on the outer circumferential surface of the piston and in which the piston packing is installed, the piston packing can easily be mounted in the installation groove adjacent to the groove part.

As a result, since the groove part for facilitating installation of the cover member having the damper portion is formed on the outer circumferential surface of the piston, it is unnecessary for the groove part to be formed on an end surface of the piston by way of a cutting process (e.g., recess processing). Thus, manufacturing costs can be reduced, and manufacturability can be improved along with enhancing ease of assembly of the piston packing.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
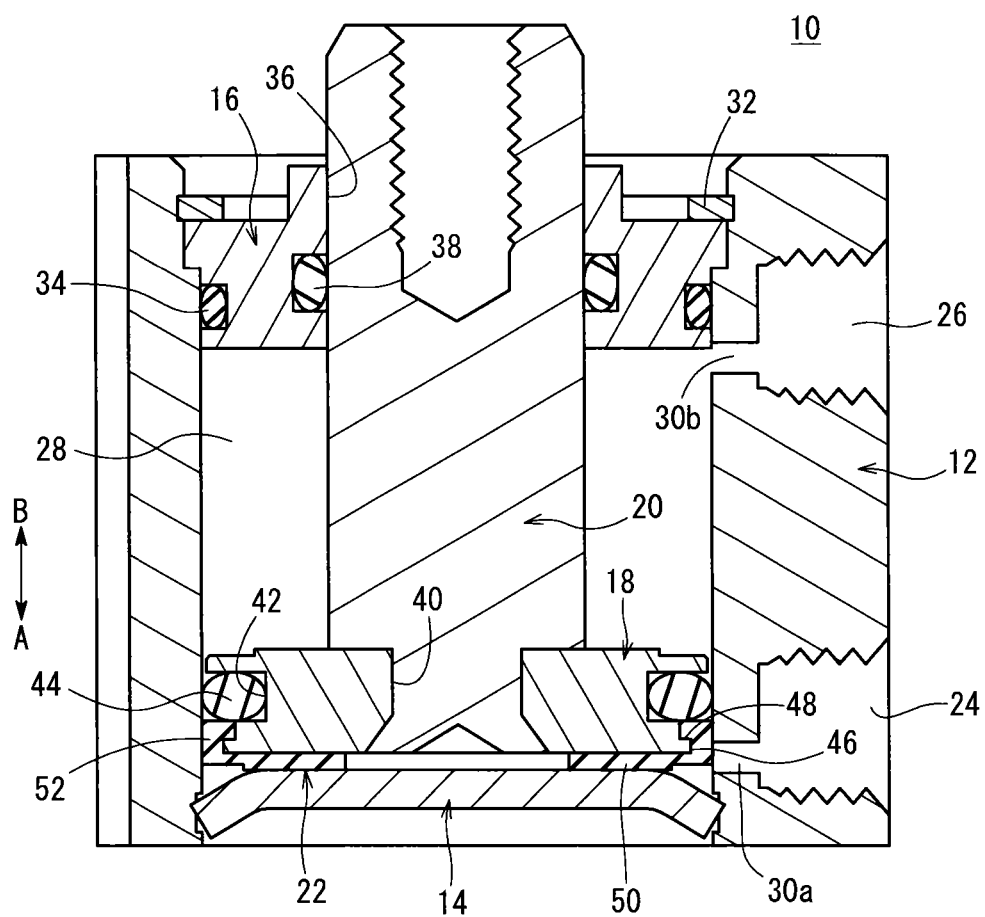
FIG. 1 is an overall cross sectional view of a fluid pressure cylinder according to an embodiment of the present invention.

As shown in FIG. 1, a fluid pressure cylinder 10 includes a cylinder tube (cylinder main body) 12 formed in a cylindrical or tubular shape, a head cover 14 installed in one end of the cylinder tube 12, a rod cover 16 installed in another end of the cylinder tube 12, a piston 18 disposed for displacement in the interior of the cylinder tube 12, a piston rod 20 connected to the center of the piston 18, and a piston cover (cover member) 22, which is mounted on one end side (in the direction of the arrow A) of the piston 18.

A first port 24 and a second port 26 open, respectively, at positions in the vicinity of one end and another end of the outer circumferential side of the cylinder tube 12. A switching device for switching a supply state of a pressure fluid is connected, for example, through non-illustrated piping, to the first and second ports 24, 26. The pressure fluid is supplied selectively to either one of the first port 24 and the second port 26.

Further, in the interior of the cylinder tube 12, a cylinder hole (cylinder chamber) 28 is formed that penetrates therethrough in the axial direction (the direction of arrows A and B). The cylinder hole 28 communicates with the first and second ports 24, 26, respectively, through communication passages 30a, 30b.

The head cover 14 is formed by press-forming a plate body made from a metal material such as aluminum or the like, such that, when inserted in the cylinder hole 28, an outer edge part thereof is inclined radially outwardly by a predetermined angle with respect to the axis of the cylinder hole 28, to thereby bite into and be installed on the inner circumferential surface of the cylinder hole 28. As a result, the head cover 14 is fixed in the cylinder hole 28 in the vicinity of one end thereof, in a state of blocking communication between the cylinder hole 28 and the exterior.

The rod cover 16 is inserted in another end side (in the direction of the arrow B) of the cylinder hole 28, and is fixed in the interior of the cylinder hole 28 by a lock ring 32, which is held in engagement with the inner circumferential surface of the cylinder hole 28.

A seal ring 34 is installed in an annular groove on an outer circumferential surface of the rod cover 16. Leakage of pressure fluid between the cylinder tube 12 and the rod cover 16 is prevented by the seal ring 34. Further, a rod hole 36 penetrates through the rod cover 16 in the center thereof, and the piston rod 20 is inserted displaceably through the rod hole 36. In addition, a rod packing 38, which is mounted on an inner circumferential surface of the rod hole 36, is disposed in sliding contact with the outer circumferential surface of the piston rod 20, whereby leakage of pressure fluid between the rod cover 16 and the piston rod 20 is prevented.

Figure 2:
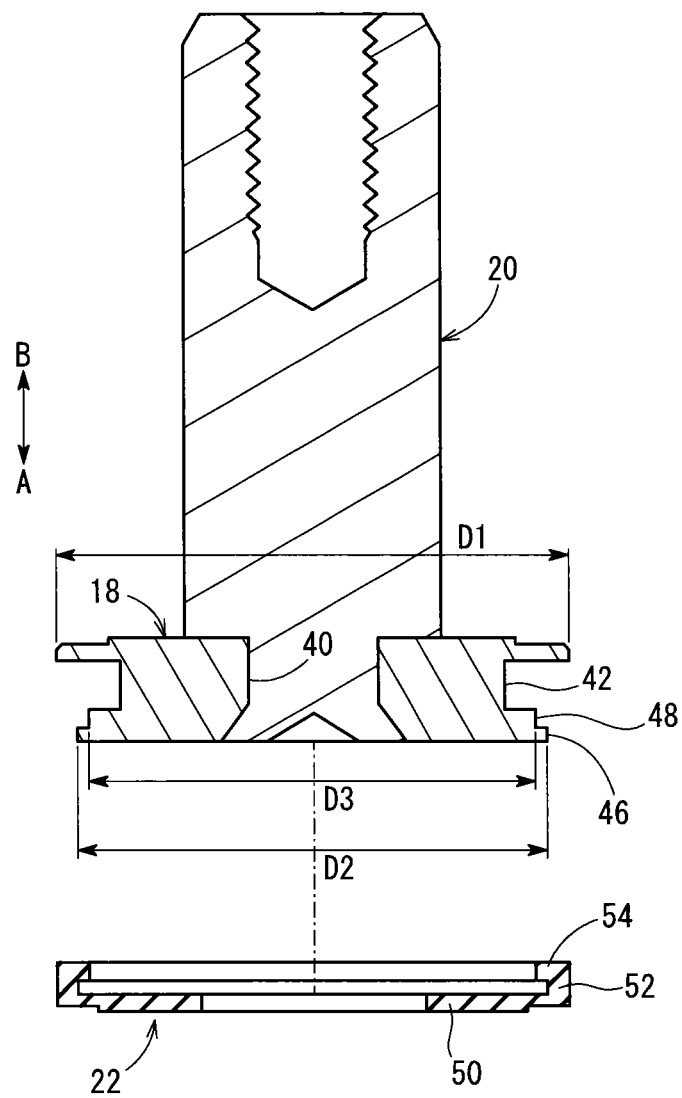
FIG. 2 is an exploded cross sectional view showing a condition in which a piston cover is removed from a piston that constitutes part of the fluid pressure cylinder of FIG. 1.
Figure 3:
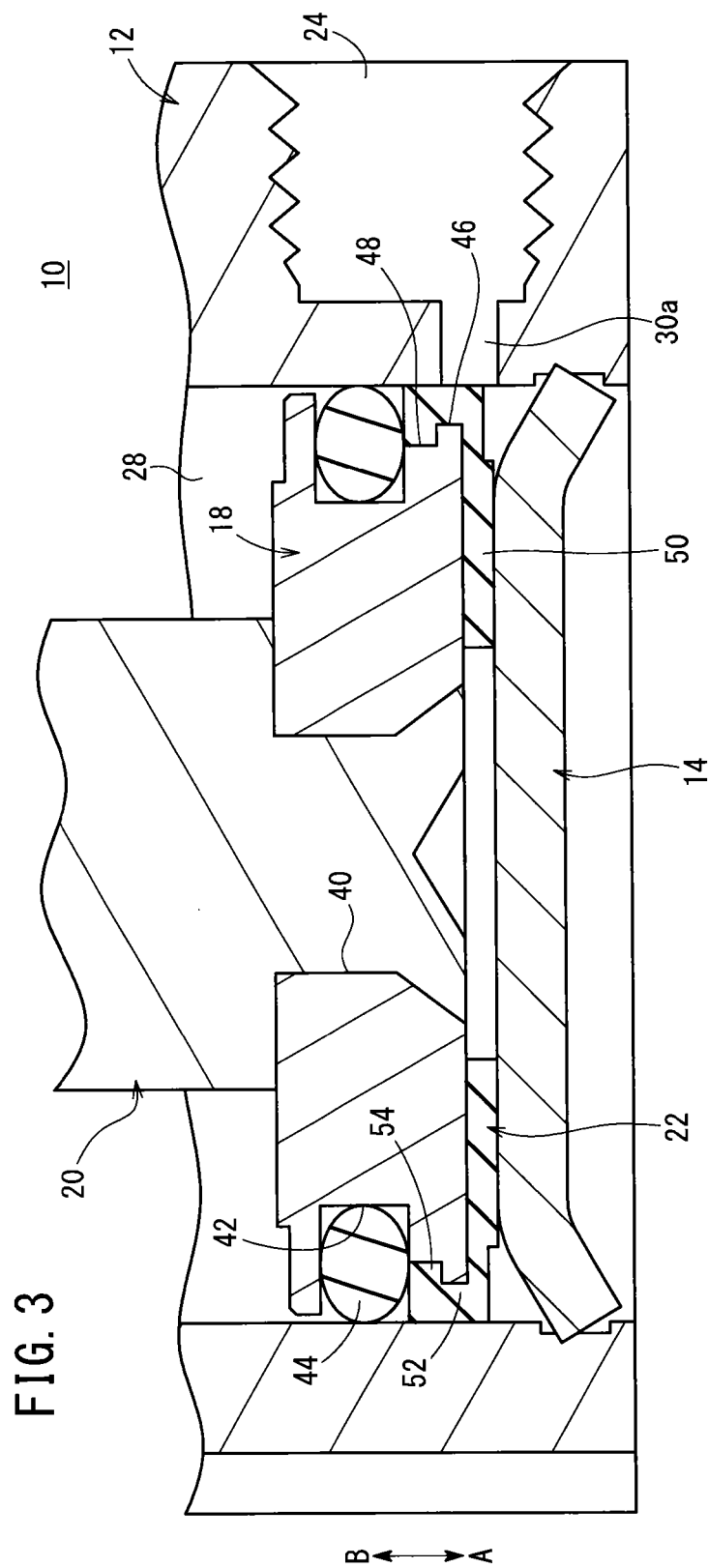
FIG. 3 is an enlarged cross sectional view showing a vicinity of the piston and the piston cover of FIG. 1.

As shown in FIGS. 1 through 3, the piston 18 is formed with a cross-sectional shape that corresponds to the cross sectional shape of the cylinder hole 28, and further is formed with a piston hole 40 in the center thereof in which one end portion of the piston rod 20 is inserted and crimped. An installation groove 42, in which a piston packing 44 is installed, is provided on the outer circumferential surface of the piston 18. The piston packing 44 is arranged in the vicinity of a substantially central position between one end surface and another end surface of the piston 18.

Further, on the outer circumferential surface of the piston 18, a first stepped portion (first groove part) 46, which is recessed a predetermined depth from the outer circumferential surface, is formed on one end surface side (in the direction of the arrow A) facing the head cover 14, and a second stepped portion (second groove part) 48, which is further recessed with respect to the first stepped portion 46, is formed adjacent to the installation groove 42. Both the first and second stepped portions 46, 48 are formed in annular shapes, with the second stepped portion 48 communicating with the installation groove 42. More specifically, as shown in FIG. 2, the outer diameter D1 of the piston 18 is the largest, the outer diameter D2 of the first stepped portion 46 is smaller than the outer diameter D1, and the outer diameter D3 of the second stepped portion 48 is smaller than the outer diameter D2 (D1>D2>D3).

The piston rod 20 is constituted from a shaft having a predetermined length in the axial direction (the direction of arrows A and B), with one end thereof being reduced in diameter. The reduced one end is inserted through the piston hole 40 of the piston 18, and then deformed and expanded in diameter, whereby the one end is connected to the piston hole 40. The other end side of the piston rod 20 (in the direction of the arrow B) is supported displaceably by insertion thereof through the rod hole 36 of the rod cover 16.

The piston cover 22 includes a disk-shaped main body portion (damper portion) 50 formed from, for example, an elastic material such as rubber or urethane, etc., a guide portion 52, which is formed on an outer edge portion of the main body portion 50 and is bent at a right angle with respect to the main body portion 50, and a hook portion 54, which is folded toward an inner circumferential side on the end of the guide portion 52. More specifically, the hook portion 54 is separated by a predetermined distance from the main body portion 50 in the thickness direction (the direction of arrows A and B) of the piston cover 22, and formed substantially in parallel with the main body portion 50. Moreover, on the piston cover 22, the main body portion 50, the guide portion 52, and the hook portion 54 are formed with a substantially constant thickness.

In addition, the main body portion 50 is placed in abutment against the one end surface of the piston 18, the guide portion 52 is installed so as to cover the outer circumferential side of the first stepped portion 46, and the hook portion 54 is installed so as to cover the outer circumferential side of the second stepped portion 48 in engagement with the second stepped portion 48, so that the piston cover 22 is installed integrally on the piston 18.

At this time, the outer circumferential surface of the guide portion 52 is formed to project out slightly with respect to the outer circumferential surface of the piston 18, so that when the piston 18 and the piston cover 22 are inserted into the cylinder hole 28, the outer circumferential surface of the guide portion 52 is in sliding contact with the inner circumferential surface of the cylinder hole 28. Consequently, the piston 18 is guided along the axial direction (the direction of arrows A and B), such that when the piston 18 is displaced toward the head cover 14 (in the direction of the arrow A), the piston cover 22 abuts against the head cover 14 without the piston 18 coming into direct contact therewith.

The fluid pressure cylinder 10 according to the present invention is constructed basically as described above. Next, installation of the piston cover 22 on one end surface of the piston 18 will briefly be described.

First, as shown in FIG. 2, the piston cover 22 is arranged to confront the one end surface of the piston 18, and the hook portion 54 side (in the direction of the arrow B) of the piston cover 22 is moved close to the piston 18. Next, in a deformed state in which the hook portion 54 is pressed and expanded slightly in a radial outward direction, the piston cover 22 is moved to the second stepped portion 48 while passing over the outer circumferential side of the first stepped portion 46. Together therewith, the main body portion 50 is made to approach the piston 18 and be placed in abutment against the one end surface of the piston 18.

Then, by releasing the deformation of the hook portion 54, the hook portion 54 is placed in engagement with respect to the second stepped portion 48 due to the elasticity of the hook portion 54. Consequently, the main body portion 50 of the piston cover 22 abuts against the one surface of the piston 18, the guide portion 52 is arranged on the outer circumferential side of the first stepped portion 46, and the hook portion 54 is placed in engagement with the second stepped portion 48. Thus, the piston cover 22 is installed integrally on the piston 18.

Next, operations and advantageous effects of the fluid pressure cylinder 10 on which the aforementioned piston cover 22 is installed with respect to the piston 18 will be explained. As shown in FIG. 1, a condition in which the piston 18 is displaced to the side of the head cover 14 (in the direction of the arrow A) and the main body portion 50 of the piston cover 22 abuts against the head cover 14 will be referred to as an initial position.

In the initial condition, by supply of a pressure fluid to the first port 24 under a switching action of a non-illustrated switching device, the pressure fluid is introduced through the communication passage 30a between the head cover 14 and the piston 18, whereupon the piston 18 is pressed and displaced toward the rod cover 16 (in the direction of the arrow B). Moreover, the second port 26 is in a state of being open to atmosphere. At this time, by sliding contact of the guide portion 52, which is arranged on the outer circumferential side of the piston 18, against the inner wall surface of the cylinder hole 28, the piston 18 is guided with high precision along the axial direction (in the direction of the arrow B). Then, the other end surface of the piston 18 is brought into abutment against the end surface of the rod cover 16, and a displacement end position is reached.

On the other hand, in the case that the piston 18 is displaced again toward the head cover 14 (in the direction of the arrow A), by supply of pressure fluid to the second port 26 under a switching action of a non-illustrated switching device, the pressure fluid is introduced through the communication passage 30b between the rod cover 16 and the piston 18, whereby the piston 18 is pressed toward the head cover 14 (in the direction of the arrow A). Consequently, the piston 18 and the piston rod 20 are displaced integrally toward the head cover 14 (in the direction of the arrow A), and the initial position is restored upon abutment of the main body portion 50 of the piston cover 22 against the head cover 14.

In this case, the one end surface of the piston 18 comes into abutment against the head cover 14 through the main body portion 50 of the piston cover 22, without the one end surface of the piston 18 abutting directly against the head cover 14. Thus, shocks occurring upon abutment are buffered (absorbed) by the damper function. Further, the piston 18 is guided highly accurately along the axial direction (the direction of the arrow A) under a guiding action of the guide portion 52.

In the foregoing manner, with the present embodiment, the piston cover 22, which is made from an elastic material, is installed on the one end surface of the piston 18 that faces to the head cover 14, such that the main body portion 50 is disposed on the one end surface, and the guide portion 52, which is arranged on the outer edge of the main body portion 50, is disposed in sliding contact with the inner circumferential surface of the cylinder tube 12. In addition, the piston cover 22 possesses a damper function when the main body portion 50 comes into abutment against the head cover 14, as well as having a guiding function performed by the guide portion 52 upon displacement of the piston 18.

Owing thereto, compared to a conventional fluid pressure cylinder with a guide member (wear ring) disposed on the outer circumferential surface of the piston 18, by providing the piston cover 22 that is doubly equipped with a damper function and a guide function, the number of parts can be reduced, accompanied with reducing the number of assembly steps and thereby enhancing ease of assembly.

Further, since a separate guide member is not needed, there is no need to form an annular groove for installation of such a guide member on the outer circumferential surface of the piston 18, and therefore, the piston 18 can be made thinner in the axial direction. As a result, accompanying thinning of the piston 18, the longitudinal dimension of the fluid pressure cylinder 10 can be made smaller in scale.

Furthermore, because the piston cover 22 is capable of being installed through engagement thereof on the first and second stepped portions 46, 48 formed on the outer circumferential surface of the piston 18, for example, compared to a case in which a groove is formed by way of a cutting process (e.g., recess processing) for installation of a damper on the one end surface of the piston 18, manufacturing costs can be reduced, since the first and second stepped portions 46, 48 can be formed from the side of the outer circumferential surface by a lathe or the like.

Further still, when the piston packing 44 is installed from the one end surface side of the piston 18 into the installation groove 42, the smaller diameter first and second stepped portions 46, 48 (D2, D3) are provided, which are recessed with respect to the outer circumferential surface (outer diameter D1) of the one end surface side. Therefore, it is unnecessary for the piston packing 44 to be widened in size, and merely by being expanded slightly more than the outer diameter D2 of the first stepped portion 46, the piston packing 44 can be installed easily with respect to the installation groove 42, which is positioned adjacent to the first and second stepped portions 46, 48. More specifically, ease of assembly of the piston packing 44 with respect to the piston 18 can be enhanced. In this case, after the piston packing 44 has been installed, upon installation of the piston cover 22, dropping off of the piston packing 44 is prevented reliably by the piston cover 22.

Still further, compared to a conventional damper, since the contact area (abutment area) of the main body portion 50 of the piston cover 22 with respect to the head cover 14 can reliably be increased, the load per unit area can be reduced. Together therewith, durability of the main body portion 50 can be improved since structural fatigue-induced settling of the main body portion 50 can be suppressed even in the case of prolonged usage thereof. Moreover, variations in the stop position (and initial position) of the piston 18 in the axial direction, which is of concern in the event of such settling, can be suppressed.

Further, there is no need to form a groove on the one end surface of the piston 18 for enabling installation of the main body portion 50 of the piston cover 22, and since simple abutment of the main body portion 50 is sufficient, for example, compared to a conventional fluid pressure cylinder in which a groove shape for engagement and installation of the damper is formed by recess processing, the number of manufacturing steps as well as manufacturing costs can be reduced.

Furthermore, because the main body portion 50 of the piston cover 22, which functions as a damper portion, is formed separately apart from the piston packing 44, the main body portion 50 and the piston packing 44 can be formed from different materials and with different hardness properties responsive to desired requirements, respectively, and thus desired properties thereof can be satisfied.

The fluid pressure cylinder according to the present invention is not limited to the above embodiment. Various changes and modifications may be made to the embodiment without departing from the scope of the invention as set forth in the appended claims.

What is claimed is:

1. A fluid pressure cylinder comprising:
    a cylinder main body having a pair of ports for supplying and discharging a pressure fluid, and a cylinder chamber into which the pressure fluid is introduced from the ports;
    a piston having surfaces providing an installation groove formed at an outer circumferential periphery of the piston, and which piston is disposed displaceably along an axial direction in an interior of the cylinder chamber;
    a piston packing installed in the installation groove to provide sealing with respect to a wall of the cylinder chamber; and
    a cover member comprising an element separate from the piston packing and mounted on one end side of the piston, the cover member having a damper portion that absorbs shocks caused when the piston comes into abutment against the cylinder main body at a displacement end position where the piston is displaced to an end of the cylinder main body,
    wherein a groove part, on which the cover member is mounted, is formed on the outer circumferential surface of the piston and is disposed adjacent to the installation groove, an outer diameter of the groove part being smaller than an outer diameter of the piston, and
    wherein the cover member forms a portion of the surfaces comprising the installation groove,
    wherein the cover member includes a guide portion that guides the piston along the axial direction of the cylinder main body, the guide portion being disposed on an outer edge portion of the damper portion and installed so as to cover a part of the outer circumferential surface of the piston, and the damper portion abuts against an end surface of the piston perpendicular to a direction of displacement of the piston, and
    wherein the cover member further comprises a hook portion disposed on an end of the guide portion and which is folded toward an inner circumferential side of the piston with respect to the guide portion.

2. The fluid pressure cylinder according to claim 1, wherein another groove part, which is recessed radially inwardly with respect to the groove part and on which the hook portion is installed, is provided on the outer circumferential surface of the piston between the groove part and the installation groove.

3. The fluid pressure cylinder according to claim 2, wherein the another groove part is formed with an outer diameter greater than a bottom of the installation groove.

4. The fluid pressure cylinder according to claim 3, wherein the installation groove comprises two annular surfaces which are perpendicular to the axis of the cylinder main body and mutually spaced from one another in the direction of the axis of the cylinder main body, wherein the hook portion forms a portion of one of the annular surfaces.

5. The fluid pressure cylinder according to claim 3, wherein the installation groove comprises two annular surfaces which are perpendicular to the axis of the cylinder main body and mutually spaced from one another in the direction of the axis of the cylinder main body, wherein the hook portion is coplanar with one of the two annular surfaces to form a portion of the installation groove.

6. The fluid pressure cylinder according to claim 1, wherein the damper portion is disposed so as to cover an end surface of the piston perpendicular to a direction of displacement of the piston.

7. The fluid pressure cylinder according to claim 1, wherein the cover member is formed from an elastic material.

* * * * *